US011402895B2

United States Patent
Kerber

(10) Patent No.: US 11,402,895 B2
(45) Date of Patent: *Aug. 2, 2022

(54) VIRTUAL REALITY SIMULATION SYSTEM

(71) Applicant: Human Mode, LLC, Oklahoma City, OK (US)

(72) Inventor: William Kerber, Edmond, OK (US)

(73) Assignee: Human Mode, LLC, Oklahoma City, OK (US)

( * ) Notice: Subject to any disclaimer, the term of this patent is extended or adjusted under 35 U.S.C. 154(b) by 562 days.

This patent is subject to a terminal disclaimer.

(21) Appl. No.: 16/587,491

(22) Filed: Sep. 30, 2019

(65) Prior Publication Data
US 2020/0241628 A1    Jul. 30, 2020

Related U.S. Application Data

(63) Continuation of application No. 16/262,380, filed on Jan. 30, 2019, now Pat. No. 10,429,924.

(51) Int. Cl.
| | | |
|---|---|---|
| *G06F 3/01* | (2006.01) | |
| *A63B 22/06* | (2006.01) | |
| *A63F 13/211* | (2014.01) | |
| *A63F 13/25* | (2014.01) | |

(52) U.S. Cl.
CPC .......... *G06F 3/011* (2013.01); *A63B 22/0664* (2013.01); *A63F 13/211* (2014.09); *A63F 13/25* (2014.09); *A63F 2300/8082* (2013.01)

(58) Field of Classification Search
CPC ............................... G06F 3/011; A63F 13/212
See application file for complete search history.

(56) References Cited

U.S. PATENT DOCUMENTS

| | | |
|---|---|---|
| 5,690,587 A | 11/1997 | Gruenangerl |
| 5,902,214 A | 5/1999 | Makikawa et al. |
| 6,102,832 A | 8/2000 | Tani |
| 6,743,154 B2 | 6/2004 | Epstein |
| 7,780,573 B1 | 8/2010 | Carmein |
| 8,704,855 B1 | 4/2014 | Berne et al. |
| 8,764,532 B1 | 7/2014 | Berme |
| 8,992,383 B2 | 3/2015 | Bilang |
| 9,056,240 B2 | 6/2015 | Carrell |
| 9,402,578 B2 | 8/2016 | Tetsuka |

(Continued)

FOREIGN PATENT DOCUMENTS

| | | |
|---|---|---|
| CN | 106569594 A | 4/2017 |
| CN | 206489518 U | 9/2017 |

OTHER PUBLICATIONS

Zero Runner ZR8 (https://campusrecmag.com/new-premium-zero-runner-from-octane-fitness/).

(Continued)

*Primary Examiner* — Jay Trent Liddle
(74) *Attorney, Agent, or Firm* — Dunlap Codding, P.C.

(57) ABSTRACT

Virtual reality simulation systems and methods are described for use with a sensory feedback system. The systems and methods include a movement detection mechanism having at least one sensor attached to a mobility simulation device. The movement detection mechanism configured to collect movement and position data of a first foot platform of the mobility simulation device, and generate movement and position data of the first foot platform. A controller computer processor unit may receive the movement and position data and translate the data into a step metric.

16 Claims, 8 Drawing Sheets

(56) References Cited

U.S. PATENT DOCUMENTS

| | | |
|---|---|---|
| 9,814,430 B1 | 11/2017 | Berme |
| 10,155,133 B2 | 12/2018 | Fung |
| 2005/0009668 A1 | 1/2005 | Savettiere et al. |
| 2005/0101439 A1 | 5/2005 | Berger |
| 2006/0063645 A1 | 3/2006 | Chiang |
| 2007/0042868 A1 | 2/2007 | Fisher et al. |
| 2018/0178123 A1 | 6/2018 | Goetgeluk et al. |
| 2018/0290017 A1 | 10/2018 | Fung |

OTHER PUBLICATIONS

International Search Report and Written Opinion dated Oct. 23, 2019, pp. 1-12, European Patent Office.

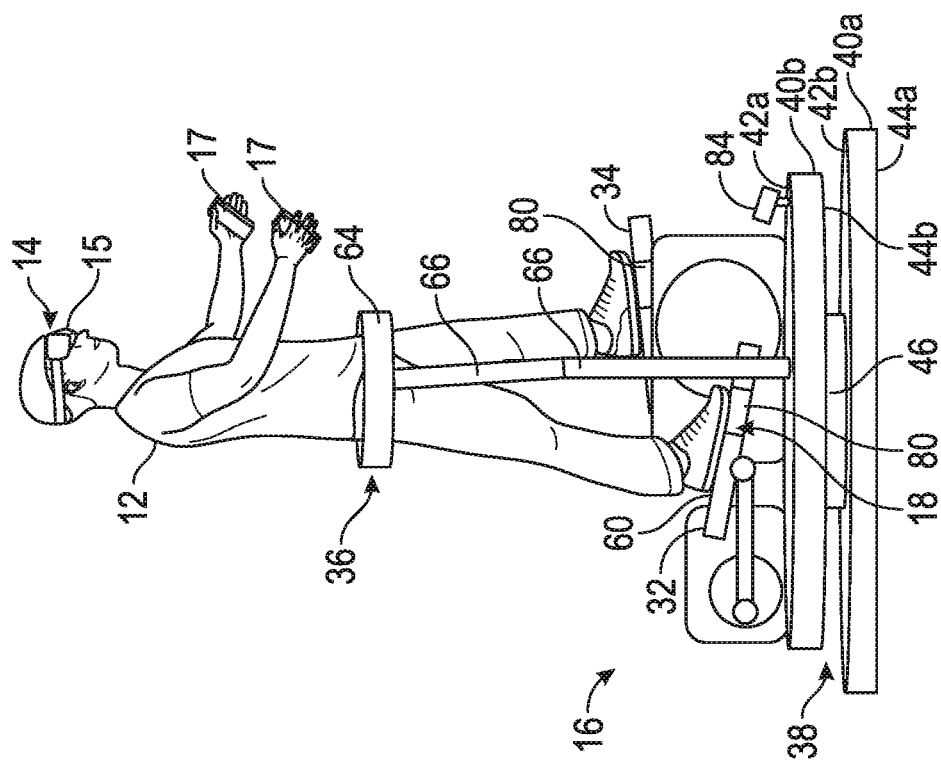
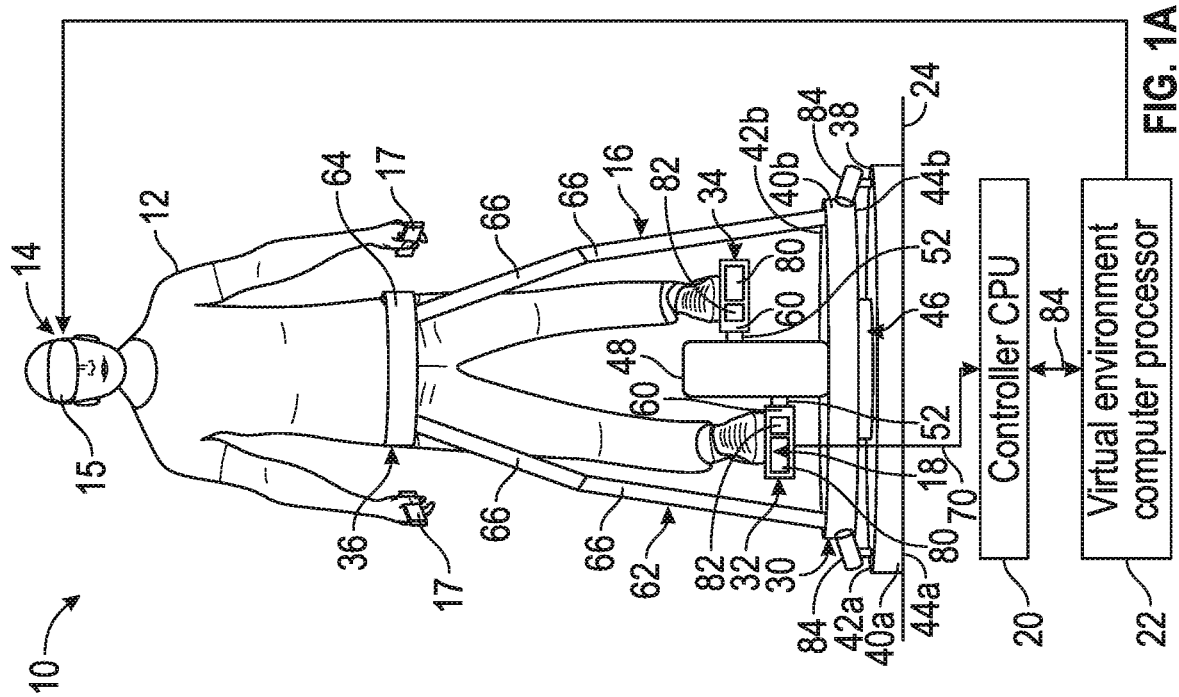

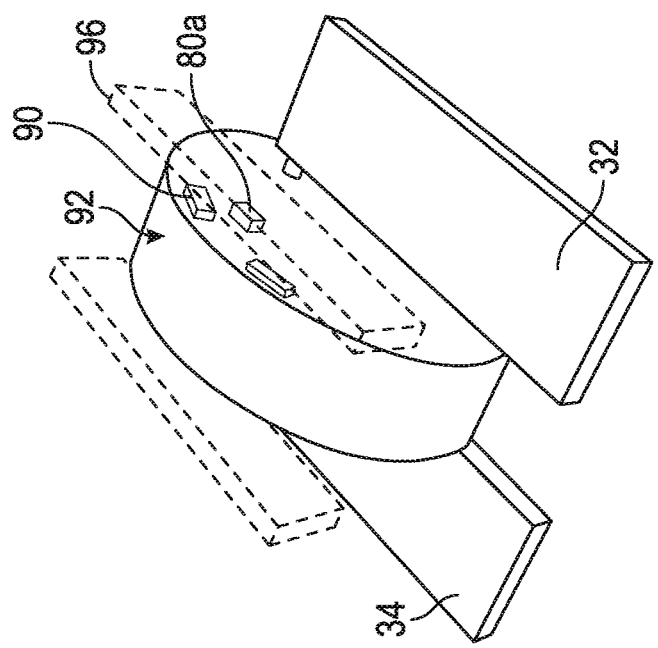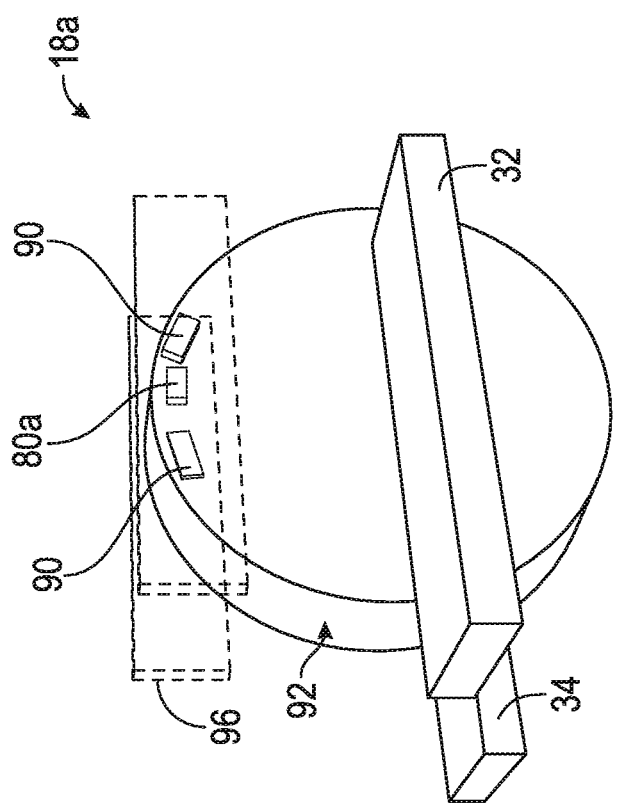

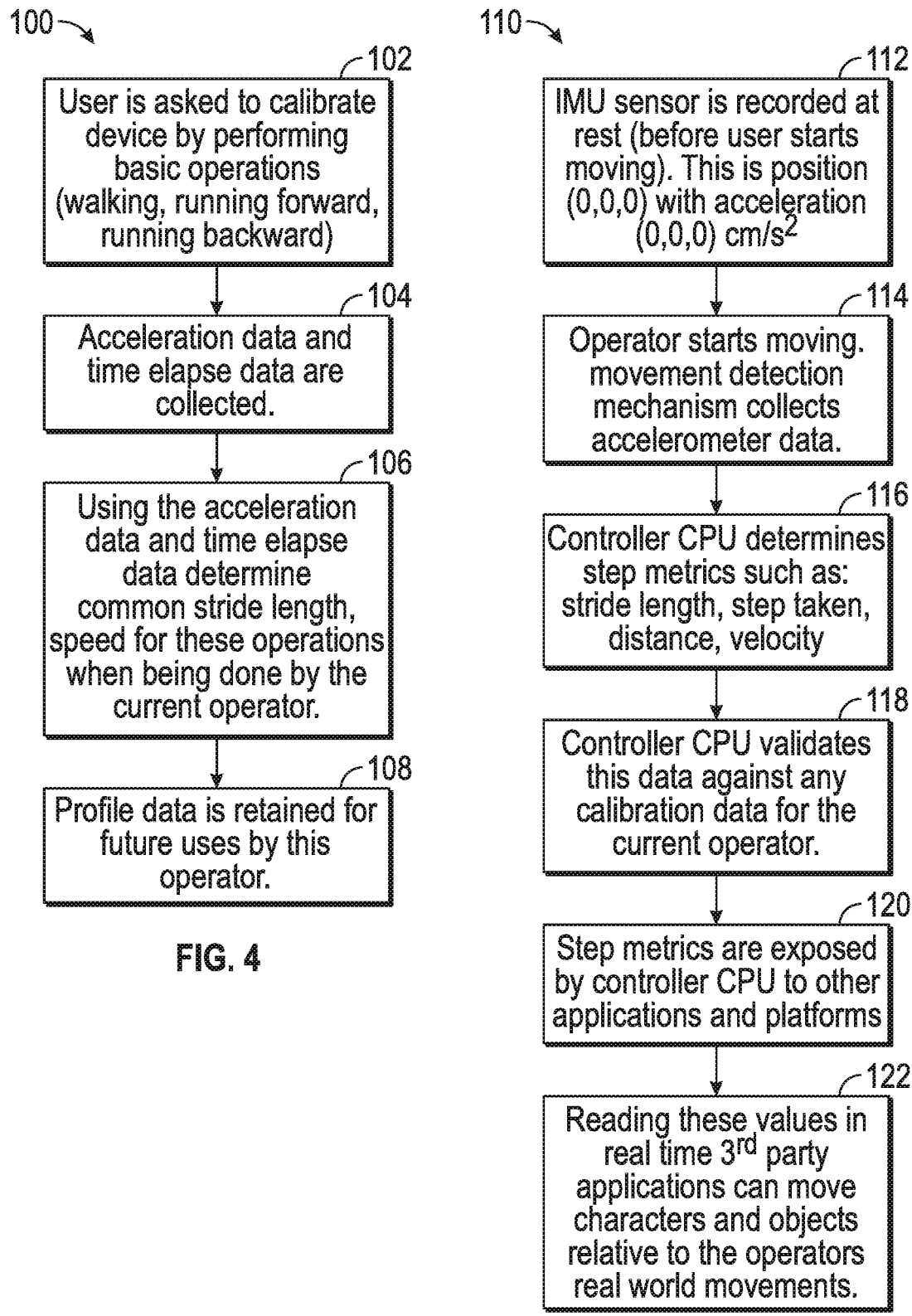

VIRTUAL REALITY SIMULATION SYSTEM

CROSS REFERENCE TO RELATED APPLICATIONS

This application is a continuation of U.S. Ser. No. 16/262,380 filed Jan. 30, 2019, the entire contents of which being hereby expressly incorporated herein by reference.

BACKGROUND

Various types of reality simulation systems have been developed, for example, game machines and devices wherein a user mounts a head-mounted display ("HDM") and watches and listens to a three-dimensional image prepared by computer graphics. Hand controllers and body sensor suits are other examples of devices used to simulate reality.

Many of the known systems and devices require the user to be relatively stationary upon watching, listening, and interacting with the three-dimensional image on the HMD in a virtual reality ("VR") environment. Although hand controllers allow a user to grab and manipulate objects in the VR environment, most reality simulation systems fail to provide adequate freedom to move the user's legs in the VR environment. Walking and running in the VR environment is complicated by the user's inability to see his legs since the user is wearing the HMD. Therefore, complete freedom to walk and run in the VR environment is dangerous.

Previous attempts to permit a user to walk in a VR environment include treadmills to simulate movement in the VR environment and confine the user. However, such devices are often impractically sized for home use. Furthermore, the user is unable to turn to the left and right on a treadmill and the motor driven treads of treadmills can be unsafe for use in a VR environment. Other previous devices include stationary platforms upon which a user slides wearing a frictionless shoe or sock. However, this sliding motion is different than walking or running and can create unhealthy pressure on the user's joints after extended use.

Thus, there is a need for a reality simulation system that can be used in a user's home, is safe for walking or running, and that allows the user lateral, hands-free movement.

BRIEF DESCRIPTION OF THE DRAWINGS

Like reference numerals in the figures represent and refer to the same or similar element or function. Embodiments of the present disclosure may be better understood when consideration is given to the following detailed description thereof. Such description makes reference to the annexed pictorial illustrations, schematics, graphs, drawings, and appendices. In the drawings:

FIG. 1A is a front elevation view of an exemplary virtual reality simulation system in accordance with the present disclosure.

FIG. 1B is a side elevation view of the virtual reality simulation system of FIG. 1A.

FIG. 2A is a side perspective view of a movement detection mechanism for use in the virtual reality simulation system illustrated in FIGS. 1A and 1B.

FIG. 2B is a perspective view of the movement detection mechanism illustrated in FIG. 2A.

FIG. 4 is a flow chart of an exemplary calibration method using a virtual reality simulation system in accordance with the present disclosure.

FIG. 5 is a flow chart of an exemplary method of using a virtual reality simulation system in accordance with the present disclosure.

DETAILED DESCRIPTION OF EXEMPLARY EMBODIMENTS

Figure 3:
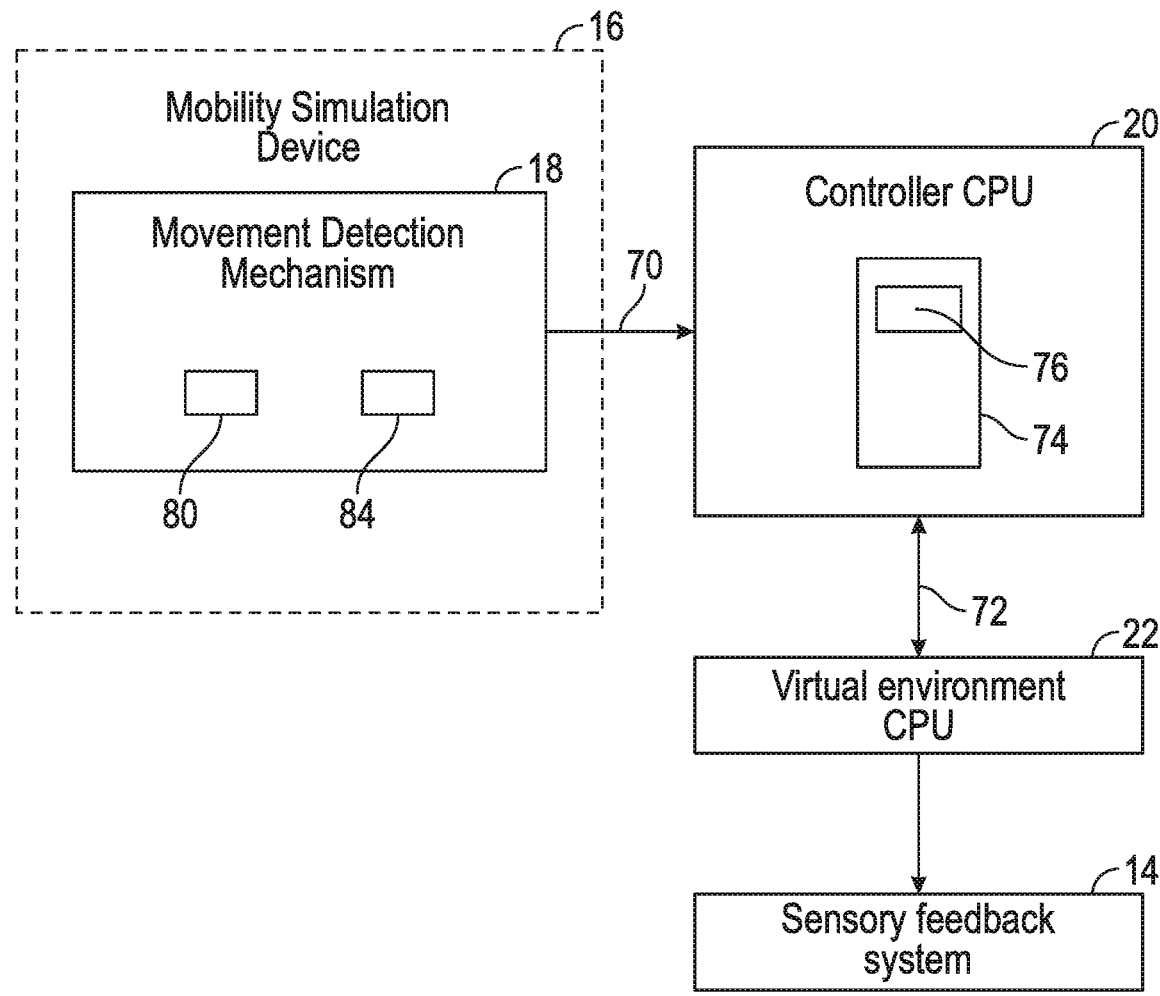
FIG. 3 is a block diagram of the exemplary virtual reality simulation system of FIGS. 1A and 1B.

Before explaining at least one embodiment of the present disclosure in detail, it is to be understood that embodiments of the present disclosure are not limited in their application to the details of construction and the arrangement of the components or steps or methodologies set forth in the following description or illustrated in the drawings. The inventive concepts in the present disclosure are capable of other embodiments or of being practiced or carried out in various ways. Also, it is to be understood that the phraseology and terminology employed herein is for the purpose of description and should not be regarded as limiting.

In this detailed description of embodiments of the inventive concepts, numerous specific details are set forth in order to provide a more thorough understanding of the inventive concepts. However, it will be apparent to one of ordinary skill in the art that the inventive concepts disclosed and claimed herein may be practiced without these specific details. In other instances, well-known features have not been described in detail to avoid unnecessarily complicating the instant disclosure.

As used herein, language such as "including," "comprising," "having," "containing," or "involving," and variations thereof, is intended to be broad and encompass the subject matter listed thereafter, equivalents, and additional subject matter not recited or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Throughout this disclosure and the claims, the terms "about," "approximately," and "substantially" are intended to signify that the item being qualified is not limited to the exact value specified, but includes slight variations or deviations therefrom, caused by measuring error, manufacturing tolerances, stress exerted on various parts, wear and tear, or combinations thereof, for example.

The use of the term "at least one" will be understood to include one and any quantity more than one, including but not limited to each of, 2, 3, 4, 5, 10, 15, 20, 30, 40, 50, 100, and all integers therebetween. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

In accordance with the present disclosure, certain components of the virtual reality simulation system include circuitry. Circuitry, as used herein, could be analog and/or digital components, or one or more suitably programmed microprocessors and associated hardware and software, or hardwired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based.

Finally, as used herein any reference to "one embodiment" or "an embodiment" means that a particular element, feature, structure, or characteristic described in the embodiment is included in at least one embodiment. The appearances of the phrase "in one embodiment" in various places in the specification are not necessarily referring to the same embodiment, although the inventive concepts disclosed herein are intended to encompass all combinations and permutations including one or more features of the embodiments described.

Referring now to FIG. 1A, shown therein is an exemplary embodiment of a virtual reality simulation system 10 in accordance with the present disclosure. Generally, the virtual reality simulation system 10 may be used to provide an interactive computer-generated experience to a user 12 that may provide the user simulation and/or creation of an illusion of walking, running, jumping, ducking or crouching within a virtual environment while interacting with virtual character(s) and virtual object(s). For example, the virtual reality simulation system 10 may provide an interactive computer-generated experience to the user 12, wherein the experience includes a natural walking motion using gliding and/or elliptical motion.

In some embodiments, the virtual reality simulation system 10 may be used with a sensory feedback system 14, such as head mount display, configured to immerse the user 12 within a simulated environment. The sensory feedback system 14 may incorporate auditory feedback, visual feedback, tactile feedback, and/or other type(s) of sensory feedback. For simplicity in description, the sensory feedback system 14 is described and shown herein to include a head-mounted display 15 for the user 12 configured to be worn by the user 12 and one or more I/O handheld devices 17; however, other types of current and future sensory feedback systems, including haptic systems, body sensor suits and/or the like, are contemplated and may be used in accordance with the present disclosure.

Referring to FIGS. 1-3, generally, the virtual reality simulation system 10 may include a mobility simulation device 16, a movement detection mechanism 18, and a controller computer processor unit (CPU) 20. The mobility simulation device 16 is configured to provide a walking or running motion for the user 12 providing position and/or movement data configured to be detectable by the movement detection mechanism 18. The controller CPU 20 is configured to receive the position and/or movement data from the movement detection mechanism 18. The controller CPU may then interact with one or more virtual environment computer processor(s) 22 to enable the sensory feedback system 14 to display images, sound and/or tactile information for enhancing the experience of the user 12 based on the position and/or movement data.

Referring to FIGS. 1A and 1B, the mobility simulation device 16 may be configured to provide the user 12 a walking and/or running simulated motion by moving legs of the user in a forward and backward elliptical motion. In some embodiments, motion may be propelled by the user 12, and as such, no motor may be needed. Generally, as the user 12 walks, each leg of the user 12 may be propelled in an elliptical fashion. As each foot of the user 12 may be suspended slightly above ground level 24.

The mobility simulation device 16 generally includes a frame 30, a first reciprocating foot platform 32 movably connected to the frame 30, a second reciprocating foot platform 34 movably connected to the frame 30, and a user support assembly 36 connected to the frame 30.

The frame 30 of the mobility simulation device 16 may be configured to support the weight of the user 12 and/or support the weight of elements of the virtual reality simulation system 10. To that end, the frame 30 may be formed of lightweight and sturdy material. Such materials may include, but are not limited to aluminum, titanium, magnesium, and/or other metals and/or metal alloys configured to provide high strength to weight ratios.

The frame 30 includes a base support 38. The base support 38 may be configured to extend parallel to the ground level 24. In some embodiments, the base support 38 may be formed of one or more stabilizing components 40 having a top surface 42 and a bottom surface 44. Each of the top surface 42 and bottom surface 44 may be parallel or substantially parallel to the ground level 24. In some embodiments, the base support 38 may be a frame structure (shown in FIG. 6) having a combination of beam, column and/or slab configured to resist lateral and/or gravity load in and/or on the virtual reality simulation system 10.

Referring to FIGS. 1A and 1B, shown therein is the base support 38 having a first stabilization component 40a and a second stabilization component 40b. Height, diameter, and/or or width of each stabilization component 40a and 40b may be based on estimated lateral and/or gravity loads in and/or on the virtual reality simulation system 10.

Referring to FIGS. 1A and 1B, in some embodiments a swivel joint 46 may be configured to provide rotation along one axis such that the user 12 may keep a continuous walking motion while turning. For example, the swivel joint 46 may be configured to provide rotation along an x-axis such that the user 12 may continue a walking motion while rotating about the x-axis in a first direction (e.g., lateral movement to the left) or a second direction (e.g., lateral movement to the right). At least a portion of the frame 30 may be movably attached to at least a portion of the base support 38 such that the first reciprocating foot platform 32, the second reciprocating foot platform 34, and the user support assembly 36 are rotatable relative to at least a portion of the base support 38.

In some embodiments, the swivel joint 46 may connect the top surface 42a of the first stabilization component 40a to the bottom surface 44b of the second stabilization component 40b. The swivel joint 46 may create a pivot point on the base support 38 such that the second stabilization component 40 may rotate about one axis allowing the user 12 to keep a continuous walking motion while pivoting in a different direction. To that end, the user 12 may be capable of pivoting in a first direction (e.g., right direction) or second direction (e.g., left direction). In some embodiments, the swivel joint 46 may be configured to lock such that the user 12 may remain in a singular direction (e.g., forward facing direction).

The frame 30 may include an upright support 48 connected to and extending from the one or more stabilization components 40. For example, in FIGS. 1A and 1B, the frame 30 includes an upright support 48 connected to the top surface 42b of the second stabilization component 38b. In some embodiments, the swivel joint 46 may be positioned between the stabilization component 40 and the upright support 48.

Referring to FIGS. 1A and 1B, the mobility simulation device 16 also includes a first reciprocating foot platform 32 and a second reciprocating foot platform 34. The first reciprocating foot platform 32 may be movably connected to the frame 30 and configured to provide movement in a first predetermined direction. For example, the first reciprocating foot platform 32 may be movably connect to the upright support 48 and suspended above the base support 38 as shown in FIGS. 1A and 1B. Similarly, the second reciprocating foot platform 34 may be movably connected to the frame 30 and configured to provide movement in a second predetermined direction. Generally, the first predetermined direction and the second predetermined direction are similar or substantially similar and simulate normal walking gait. It should be noted that the first predetermined direction and the second predetermined direction may be different to aid in simulation of an individual's particular gait pattern (e.g., first reciprocating foot platform may be angled 35 degrees relative to the second reciprocating foot platform to simulate an individual's particular gait pattern).

The first reciprocating foot platform 32 and the second reciprocating foot platform 34 may be connected to the frame 30 by one or more axles 52 providing movement in the first predetermined direction and the second predetermined direction. In some embodiments, the first reciprocating foot platform 32 may move in conjunction with the second reciprocating foot platform 34.

In some embodiments, the configuration of the one or more axles 52 may provide rear drive, front drive, or center drive depending on location of one or more axles 52. Generally, the first and second reciprocating foot platforms 32 and 34 may be connected via a linkage. This can be accomplished by the mobility simulation device 16 including the linkage connecting the first and second reciprocating foot platforms 32 and 34 together. The linkage can be mounted on the second stabilization member 40b. In one embodiment, the linkage may include a left crank and a right crank rotatably mounted on the upright support 48. A first leg may be connected to the left crank, and a second leg may be connected to the right crank. The first reciprocating foot platform 32 is movably connected to the first leg, and the second reciprocating foot platform 34 is movably connected to the second leg. The first reciprocating foot platform 32 may move in conjunction with the second reciprocating platform 34.

In some embodiments, each of the first reciprocating foot platform 32 and the second reciprocating foot platform 34 may include an upper surface 60 configured in a shape of a foot. For example, the upper surface 60 may be planar, or shaped in a similar manner as an insole. In some embodiments, the upper surface 60 may be shaped (e.g., molded) to mate with a particular individual's foot. In some embodiments, the upper surface 60 may have one or more sizes configured to fit particular shapes of feet (e.g., sizes, widths, arches).

The user support assembly 36 may include side body supports 62 connected to the frame 30, and a support ring 64 connected to the side body supports 62. In some embodiments, each side body support 62 may include one or more units 66 configured to extend from the second stabilization unit 40b of the base support 38 to the support ring 64. Attachment of the unit(s) 66 to the second stabilization unit 40b may allow for lateral movement of the user 12 via the swivel joint 46. In some embodiments, two units 66 may be configured to each extend from the second stabilization unit 40b of the base support 38 to the support ring 64. One or more units 66 may be adjustable in size such that the support ring 64 may be positioned on the user 12 at a particular location (e.g., waist, hips, chest).

Generally, the support ring 64 may be an adjustable support configured to encircle a midsection of the user 12 for stabilization during operation of the system 10. In some embodiments, the support ring 64 may be a flexible band of material configured to encircle a portion of the body of the user 12. The band of material may be continuous or be configured to attach or couple at one or more ends (e.g., hook and loop fastener, button, buckle). In some embodiments, the support ring 64 may include one or more clips configured to connect to clothing of the user 12.

Stabilization of the user 12 using the support ring 64 may facilitate a hands-free system (e.g., operation of the virtual reality simulation system 10 or at least the mobility simulation device 16 without using hands). As such, the user 12 may be able to engage in lateral (i.e., side-to-side) movement and simulate walking or running on the first and second foot platforms 32 and 34 of the mobility simulation system 16 while the user support assembly 36 provides upright support to the user 12 (e.g., around the user's abdomen) thereby allowing the user 12 to freely use its hands and further enhance the virtual reality experience.

The movement detection mechanism 18 may determine position of each of the first reciprocating foot platform 32 and/or the second reciprocating foot platform 34. In some embodiments, the movement detection mechanism 18 may provide vector data of the first reciprocating foot platform 32 in at least a first dimension (e.g., x-direction) and a second dimension (e.g., y-direction). Additionally, the movement detection mechanism 18 may provide acceleration data, rotation data, and/or the like. The movement detection mechanism 18 may use one or more sensors 80 to determine position data and/or movement of the first reciprocating foot platform 32 and/or the second reciprocating foot platform 34. The one or more sensors 80 may be attached to the mobility simulation device 16, embedded within the first reciprocating foot platform 32 and/or the second reciprocating foot platform 34, and/or attached to the user 12 (e.g., strapped to one or more legs of the user 12). For example, the movement detection mechanism may include one or more sensors 80 attached to the first reciprocating foot platform 32 and/or second reciprocating foot platform 34. Sensors 80 may include, but are not limited to inertial measurement unit sensors (IMU), infrared emitters and infrared sensor systems, natural interaction sensors, and/or the like.

In some embodiments, the movement detection mechanism 18 may use an IMU system to determine position data (e.g., vector data) and/or movement data of the first reciprocating foot platform 32 and/or the second reciprocating foot platform 34. The sensors 80 of the IMU system may detect linear acceleration and rotational rate, for example, of the first reciprocating foot platform 32 to determine position data and/or movement of the first reciprocating foot platform 32 and/or the second reciprocating foot platform 34. For example, the IMU system may be configured to determine motion along one or more axis and translate such motion into movement. When the first reciprocating foot platform 32 and the second reciprocating foot platform 34 are mechanically linked together so that the three dimensional location of one of foot platforms 32 or 34 can be determined from the three dimensional location of the other foot platform 32 or 34, then only one sensor may be used to determine the location of both of the first and second reciprocating foot platforms 32 and 34.

In some embodiments, the movement detection mechanism 18 may use one or more infrared emitter(s) 82 and infrared sensor(s) 84 to determine position data and/or movement data of the first reciprocating foot platform 32 and/or the second reciprocating foot platform 34. Generally, the infrared emitter 82 may be positioned on the first reciprocating foot platform 32 and/or the body of the user 12. The infrared sensor 84 may be positioned on the base 38 and configured to track the infrared emitter 82 to provide position (x, y, z) of the infrared emitter 82 at a first time $T_0$ and a second time $T_1$. The values of position (x, y, z) and the first time $T_0$ and a second time $T_1$ may be used to determine distance and speed traveled by the infrared emitter 82, for example.

In some embodiments, the movement detection mechanism 18 may use one or more natural interaction sensor systems. The natural interaction sensor system may include one or more emitters, one or more depth sensors (e.g., infrared depth sensor), one or more optical sensors (e.g., high frame rate digital cameras (e.g., 30-290 frames per second), and/or combinations thereof. Generally, one or more emitters may be configured to supply light within IR range or visible range. The depth sensor(s) may be adapted to receive and interpret reflections of light supplied by the emitter and determine distance between the depth sensor and the platform 32 and/or 34. For example, the natural interaction sensor system may use infrared light with an advanced CCD camera positioned behind a dark IR filter to sense position and/or movement of the platforms 32 and/or 34. One or more sensors may be combined together in a housing to form a natural interaction sensor, which may be photoelectric based, sonar, based, non-photoelectric based and/or combinations thereof. The sensor(s) may supply and/or detect a medium, such as light in a visible spectrum and/or an infrared spectrum. In some embodiments, the sensor(s) may supply and/or detect one or more laser beams or radio frequency signals. In some embodiments, the sensor(s) may provide a sequence of synchronized depth images, color video images, and/or audio streams.

FIGS. 2A and 2B illustrate an exemplary embodiment of a movement detection mechanism 18a wherein a plurality of emitters 90 (e.g., magnets) may be positioned about an elliptical wheel 92. Emitters may include, but are not limited to, magnets, RFID tags, laser light emitters, and/or the like. One or more sensors 80a may be positioned within housing 96 of the elliptical wheel 92. The elliptical wheel 92 moves relative to the housing 96. In one embodiment, the location of the housing 96 is fixed relative to the elliptical wheel 92 so that only movement of the elliptical wheel 92 is measured by the sensors 80a. Sensors 80a may include, but are not limited to, magnetic sensors, RFID sensors, laser light sensors, and/or the like. As rotation of the elliptical wheel 92 occurs, each emitter 90 may pass close to the sensor 80a during each rotation. The sensor 80a may register each passing (e.g., electrical charge created by close contact with the emitter 90 (e.g., magnet).

In some embodiments, each emitter 90 may have an identifiable signature that can be detected by the sensor(s) 80a. For example, each emitter 90 may have a different strength. By using emitters 90 having different strengths (or other identifiable signature), the sensor 80a may be configured to determine which emitter 90 passes first (e.g., first emitter vs. second emitter), and thus, determine whether the elliptical wheel 92 has completed one or more revolutions and/or direction of each revolution. Distance of travel may be determined by using an assumption that each revolution may be equivalent to a particular stride (e.g., one normal human stride). Speed of reading by the sensor 80a may relate to speed of walking, running, and/or the like.

Generally, the movement detection mechanism 18 may provide a signal 70 indicative of position and/or movement data to the controller CPU 20. The signal 70 may be transmitted to the controller CPU 20 via a wired connection (e.g., standard data cables such as USB) or wireless connection (e.g., Bluetooth, WiFi, iEEE 802.11a, b, g or n).

The controller CPU 20 may receive the signal 70 from the movement detection mechanism 18 and process the position data and/or movement data into one or more step metrics. Step metrics may include, but are not limited to, stride length, steps taken, distance, velocity, and/or the like. The one or more step metrics may then be provided to the virtual environment computer processor 22(s) via signal 72.

Referring to FIGS. 2 and 3, the controller CPU 20 is able to embody and/or execute the logic of the processes described herein. Logic embodied in the form of software instructions and/or firmware may be executed on dedicated system or systems, on distributed processing computer systems, and/or the like. In some embodiments, the logic may be implemented in a stand-alone environment operating on a single system and/or logic may be implemented in a networked environment such as a distributed system using multiple computers and/or processors. For example, microprocessors 74 may work together or independently to execute processor executable code using one or more memories 76. To that end, in some embodiments, the controller CPU 20 may be integral and/or attached to the mobility simulation device 16 and/or communicate via one or more networks (e.g., wired, wireless). For example, in some embodiments, the controller CPU 20 may be positioned on the first reciprocating foot platform 32, the second reciprocating foot platform 34, upright support 48 and/or frame, for example. In some embodiments, the controller CPU 20 may be positioned external and at a distance to the mobility simulation device 16. For example, in some embodiments, the controller CPU 20 may receive position data and/or movement data over a wireless network. In some embodiments, the controller CPU 20 may include multiple microprocessors 74 positioned internally and externally to the mobility simulation device 16.

The movement detection mechanism 18 may provide acceleration (a) in a given direction (x, y, z) and elapsed time (t) between readings. Using acceleration and elapse time, the change in distance during a reading and velocity may be determined. For example, for determining distance when acceleration and time are known, the controller CPU 20 may determine change in distance using:

$$S = UT + \tfrac{1}{2}(AT^2) \quad\quad (EQ. 1)$$

wherein U is initial velocity. In assuming a 1 second time lapse (i.e., $T_0=0$ and $T_1=1$), acceleration may be 76.2 cm/s$^2$ in the z-direction, for example. Average male walking stride is approximately 76.2 cm, or 38.1 cm for each leg, for example. The accelerometer reading may generally begin at (0, 0, 0) cm/s$^2$ in all directions at $T_0=0$. As such, the IMU system may move in only two directions (y, z). As the legs of the user 12 move in a normal stride at $T_1=1$, the accelerometer may determine an acceleration of (0, 50.1, 76.2) cm/s$^2$, for example. Using the acceleration and time, change in position vector may be determined to be (0, 20.5, 38.1) cm.

In some embodiments, the controller CPU 20 may be trained for each user 12. For example, the user 12 may be asked to perform particular operations (i.e., tasks) including, but not limited to, walking, running, and the like. The controller CPU 20 may sample movements for reference and determine change in position for one or more of the sample movements. The controller CPU 20 may determine the user's particular stride patterns, and as such, improve accuracy of modeling of movement during use. Calibration may aid in providing an accurate interpretation of movements; however, default values based on average stride length and/or average velocities of walking and/or running for men, women, and/or children may be determined in lieu of or in addition to calibration methods. To that end, the one or more memories 76 may store processor executable code and/or information comprising one or more databases with the one or more databases being a calibration database configured to store calibration data for each user, a baseline database configured to store average default values, and/or the like.

FIG. 4 illustrates a flow chart 100 of an exemplary calibration process for use with the virtual reality simulation system 10. In a step 102, the user 12 may be queried to perform one or more operations. Operations may include, for example, walking forward, walking backward, running forward, running backward, and/or the like. In a step 104, acceleration data and time elapse data may be collected via the movement detection mechanism 18. The movement detection mechanism 18 may provide the acceleration data and time elapse data to the controller CPU 20. In some embodiments, the movement detection mechanism 18 may provide (x,y,z) vector position at two different times ($T_0$ and $T_1$) collected from infrared emitter(s) 82 and infrared sensors(s) 84 in lieu of or in addition to acceleration and time elapse data. In a step 106, using acceleration data and time elapse, the controller CPU 20 may determine common stride length and/or speed for operations when being done by the current user 12. In a step 108, profile data for the user 12 including common stride length and/or speed may be stored in one or more memories 76 for future use and/or future calibration.

Change in distance and velocity may be used to determine one or more step metrics. Step metrics may include stride length, velocity of the user 12, steps taken, distance traveled by the user 12, and/or the like. For example, by analyzing distance between position vectors, the controller CPU 20 may determine stride length of the user 12. In another example, distance of the stride divided by the time passed may provide velocity of the user 12. Knowing the velocity of the user 12 may aid in the determination of whether the user 12 may be walking or running, In another example, steps taken may be determined by first recognizing when the position vector first moves from the initial vector (0, 0, 0); second moves beyond a predetermined threshold; and third when the step is complete as the user's foot returns close to or at the (0, 0, 0) position or within a predetermined threshold. In another example, distance traveled may be determined using stride length and the number of steps taken. The controller CPU 20 may determine position that the user 12 may have walked or ran within a real-world environment. Speed for each step may provide walking or running velocity of the user 12 in a real-world environment, that can then be translated into walking or running velocity of the user 12 in the virtual environment.

FIG. 5 illustrates a flow chart 110 of an exemplary method of determining one or more step metrics using the virtual reality simulation system 10. In a step 112, the sensor 80 (e.g., IMU sensor) may be recorded at rest (i.e., prior to movement by the user 12) by the movement detection mechanism 18. The position at rest may be (0,0,0) with acceleration of (0,0,0) cm/s$^2$, for example). In a step 114, the user 12 may begin moving with the movement detection mechanism 18 providing position and movement data to the controller CPU 20 (e.g., acceleration data and time elapse data). In a step 116, the controller CPU 20 may use the position data and movement data to determine one or more step metrics such as stride length, step(s) taken, distance, velocity, and/or the like. In a step 118, the controller CPU 20 may optionally validate the step metric data using calibration data for each particular user 12 (e.g., current operator). In a step 120, step metrics may be provided by the controller CPU 20 to other application and/or platforms, such as the virtual environment computer processor(s) 22. In a step 122, third party applications may use the step metrics to move characters and objects relative to movements of the user 12 in a real world environment. In some embodiments, movement of characters and objects may be in real time.

The virtual environment computer processor(s) 22 may receive the signal 72 from the controller CPU 20 and enable the sensory feedback system 14 to provide the user 12 the experience (e.g., sound, visual, tactile) relative to position and/or movement of the user 12. For example, by using the one or more step metrics, the virtual environment computer processor(s) 22 may be configured to cause the sensory feedback system 14 to display in real-time images including, but not limited to, characters and/or objects relative to the one or more step metrics corresponding to position and/or movement of the user 12. In some embodiments, the virtual environment computer processor(s) 22 may run any commonly known virtual reality platform (e.g., Oculus, HTC Vive, Unity, Unreal, CryEngine, and the like). Such virtual environment platforms commonly move objects using distance and velocity (e.g., Unity platform "MoveTowards" method).

In some embodiments, the virtual environment computer processor(s) 22 may transmit signals to the controller CPU 20 to restrict and/or disable movement of the mobility simulation device 16. For example, if the user 12 approaches visuals of a wall as viewed within the sensory feedback system 14, the virtual environment computer processor(s) 22 may transmit one or more signals to the controller CPU 20 with the controller CPU configured to restrict and/or disable movement of the mobility simulation device 16 (e.g., locking of the swivel joint 46, restriction of the first reciprocating foot platform 32, and/or the like).

Figure 6:
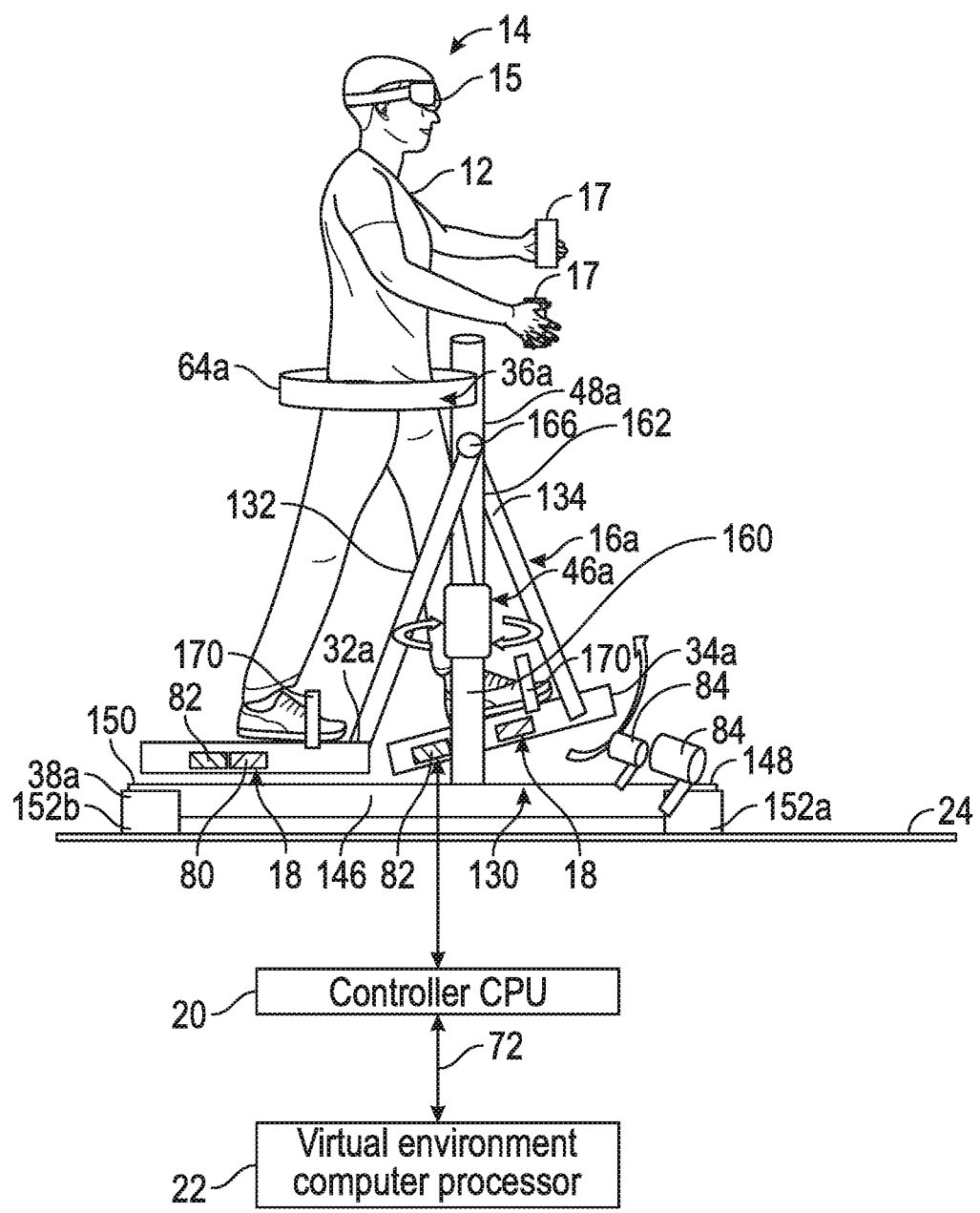
FIG. 6 is a side elevation view of another exemplary virtual reality simulation system in accordance with the present disclosure.
Figure 7:
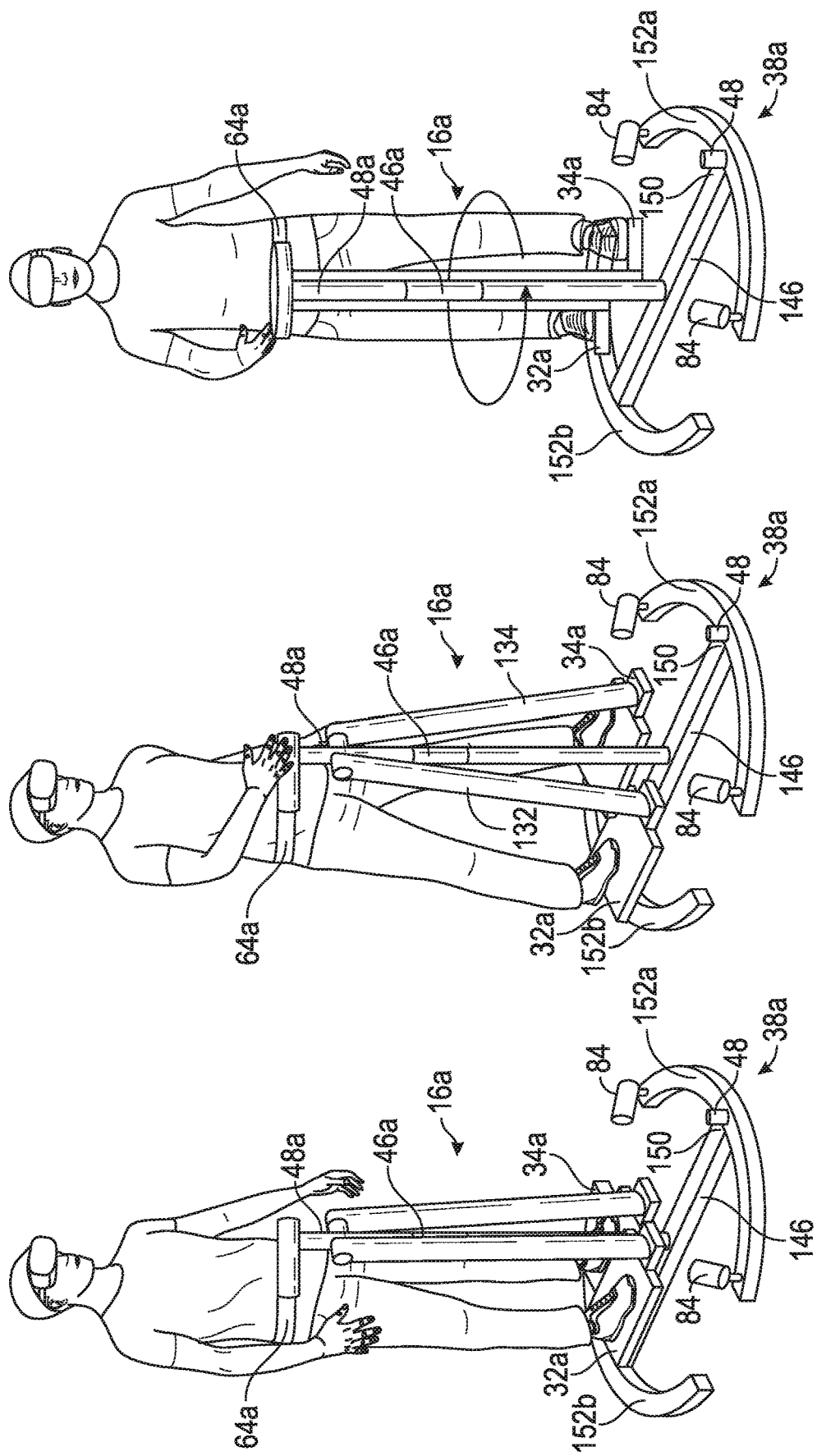
FIGS. 7A-7C are perspective view of exemplary virtual reality simulation systems in accordance with the present disclosure.
Figure 8:
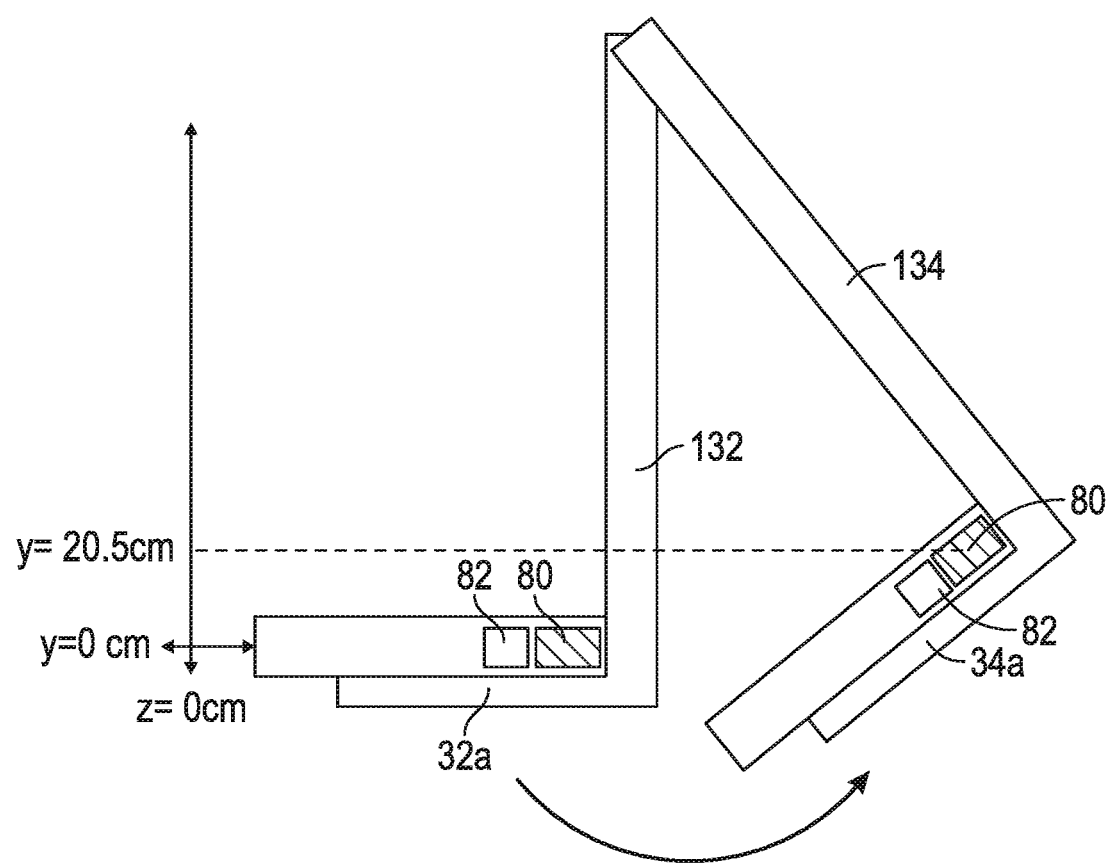
FIG. 8 is a schematic view of a reciprocating foot platform of a virtual reality simulation system.

FIGS. 6-8 illustrate another exemplary embodiment of a virtual reality simulation system 10a in accordance with the present disclosure. Generally, the virtual reality simulation system 10a may substantially simulate natural walking and/or running in a virtual reality environment using a gliding-type motion. Aspects of the virtual reality simulation system 10a may include one or more body supports (e.g., support ring 64), one or more sensors 80 configured to track motion of movement of legs of the user, one or more swivel joints configured to allow the user to pivot left or right to simulate walking and/or running in a left or right direction, and/or program logic configured to translate movement of the user and convert such movement into one or more inputs capable for use in a virtual reality platform (e.g., Oculus, HTC Vive, and/or the like).

Similar to the virtual reality simulation system 10, the virtual reality simulation system 10a may be used with the sensory feedback system 14 configured to immerse the user 12 within a simulated environment. The sensory feedback system 14 may incorporate auditory feedback, visual feedback, tactile feedback, and/or other type(s) of sensory feedback. For simplicity in description, the sensory feedback system 14 is described and shown herein to include the head-mounted display 15 for the user 12 configured to be worn by the user 12 and one or more I/O handheld devices 17.

Referring to FIG. 6, generally, the virtual reality simulation system 10a may include the movement detection mechanism 18 and the controller CPU 20 similar to the virtual reality simulation system 10. A mobility simulation device 16a may be configured to provide walking or running motion for the user 12 in a gliding motion configured to be detectable by the movement detection mechanism 18. The controller CPU 20 may be configured to receive the movement data from the movement detection mechanism 18. The controller CPU 20 may then interact with one or more virtual environment computer processor units 22 to enable the sensory feedback system 14 to display images, sound and/or tactile information for enhancing the experience of the user 12.

The mobility simulation device 16a may be configured to provide the user 12 in a walking and/or running simulated motion by swinging legs of the user in a forward and backward trajectory via a pendulum type motion. Generally, the mobility simulation device 16a includes a frame 130 having a first leg 132 and a second leg 134 attached thereto. As the user 12 walks, the first leg 132 and the second leg 134 swing on an axis in a gliding motion. As each leg 132 and 134 may be suspended slightly above ground level 24, movement may be frictionless with the ground. As such, the user 12 may be capable of walking and/or running while remaining in substantially the same position. In some embodiments, motion may be propelled by the user 12, and as such, no motor may be needed. In some embodiments, one or more motors may aid in movement of one or more legs 132 and/or 134. FIGS. 7A and 7B illustrate the user in a standing position on the virtual reality simulation system 10a and in a walking position having the second leg 134 in a first forward position on the virtual reality simulation system 10a.

The mobility simulation device 16a generally includes the frame 130, the first leg 132 movably connected to the frame 130, the second leg 134 movably connected to the frame 130, and the user support assembly 36 connected to the frame 130. In some embodiments, the first leg 132 and/or the second leg 134 may include one or more springs allowing the user 12 to simulate a jumping motion. In some embodiments, one or more springs may be positioned within the upright support 48a allowing the user 12 to simulate a jumping motion. In some embodiments, one or more of the platforms 32a and 34a may include one or more springs allowing the user 12 to simulate a jumping motion.

The frame 130 of the mobility simulation device 16a may be configured to support the weight of the user 12 and/or support the weight of elements of the virtual reality simulation system 10. The frame 130, similar to frame 30, may be formed of lightweight material configured to provide high strength to weight ratios. The frame 130 may include an upright support 48a connected to and extending from the base support 38a. For example, in FIG. 6, the frame 130 includes the upright support 48a extending from the beam 146. The upright support 48a may be connected to the base support 38a at a position configured to counter balance weight of the user 12 during use (e.g., movements from center).

The base support 38a may extend parallel to the ground level 24. The base support 38a illustrated in FIGS. 7-9 includes a beam 146 having a first end 148 and a second end 150. One or more cross beams 152 may intersect with the beam 146. For example, a first cross beam 152a intersects the beam 146 at the first end 148 and a second cross beam 152b intersects the beam 146 at the second end 150 on the frame 130 illustrated in FIGS. 7A and 7B. Cross beams 152 may be any shape configured to stabilize the frame 130 and/or loads associated with the virtual reality simulation system 10a. To that end, cross beams 152 may be substantially straight, curved, S-shaped, and/or any fanciful shape. Height and/or width of the beam 146 and cross beam(s) 152 may be configured to resist lateral and/or gravity load in and/or on the virtual reality simulation system 10.

In some embodiments, one or more swivel joints 46 may be configured within the frame 130 to provide rotation along an axis such that the user 12 may keep a continuous walking and/or running motion while turning (e.g., turning the body of the user in left direction or turning the body of the user in a right direction). For example, as illustrated in FIG. 7C, at least a portion of the frame 130 may be movably attached such that the first reciprocating foot platform 32, the second reciprocating foot platform 34 and the support ring 64a may be rotatable relative to at least a portion of the base support 38a.

In some embodiments, the swivel joint 46a may be positioned within the upright support 48, as illustrated in FIGS. 7 and 8. For example, the upright support 48a may include a first member 160 and a second member 162. The swivel joint 46a may be positioned between the first member 160 and the second member 162 such that a portion of the upright support 48a is movable in relation to the base support 38a. The second member 162 may rotate about one axis allowing the user 12 to keep a continuous walking motion while pivoting in a different direction about the axis. In some embodiments, the swivel joint 46a may be configured to lock such that the first member 160 and the second member 162 position the user 12 in a singular direction (e.g., forward facing direction). Generally, the swivel joint 46a may be positioned within the upright support 48a at an optical height to allow for the user 12 to rotate while simulating walking in a particular direction (e.g., left or right). In some embodiments, the swivel joint 46a may be motorized such that the user 12 may be able to control lateral movements (e.g., left movement). For example, lateral movement may be initiated by the user by pressing or depressing one or more buttons on the I/O handheld devices 17.

The mobility simulation device 16a also includes a first reciprocating foot platform 32a and a second reciprocating foot platform 34a similar to the first reciprocating foot platform 32 and second reciprocating foot platform 34 in FIGS. 1A and 1B. The first reciprocating foot platform 32a may be movably connected to the leg 132 of the frame 130 and configured to provide movement in a first predetermined direction. For example, the first reciprocating foot platform 32a may be movably connect to the leg 132 and suspended above the base support 38a as shown in FIG. 6. Similarly, the second reciprocating foot platform 34a may be movably connected to the leg 134 of the frame 130 and configured to provide movement in a second predetermined direction. Generally, the first predetermined direction and the second predetermined direction are similar or substantially similar and simulate normal walking gait. In some embodiments, each reciprocating foot platform 32a and 34a may be fixedly connected to each leg 132 and 134 respectively (e.g., formed as a single unit, fixedly attached). In some embodiments, the first reciprocating foot platform 32a and the second reciprocating foot platform 34a may be pin connected to each leg 132 and 134 respectively allowing for limited rotation in a single direction, for example.

The first leg 132 and the second leg 134 may be connected to the upright support 48a of the frame 130 via an axle 166. Each of the first leg 132 and the second leg 134 may be configured to swing freely in a pendulum type motion from the axle 166. FIGS. 7A and 7B illustrate motion of the first leg 132 and the second leg 134. The user 12 in FIG. 7A is in an equilibrium position at stand still. As the user 12 moves, the second leg 134 attached to the frame 130 at the axle 166 may swing forward in a pendulum type motion as illustrated in FIG. 7B as the first leg 132 swings backward in a pendulum type motion. The restoring force due to gravity may accelerate the second leg 134 and the first leg 132 back to the equilibrium position shown in FIG. 7A. The momentum may then move the first leg 132 attached to the frame 130 at the axle 166 forward in a pendulum type motion as the second leg 134 moves backward in a pendulum type motion.

In some embodiments, each of the first reciprocating foot platform 32a and the second reciprocating foot platform 34 may include the upper surface 60 configured in a shape of a foot of a user. In some embodiments, the first reciprocating foot platform 32a and the second reciprocating foot platform 34 may include one or more foot straps 170. The one or more foot straps 170 may be adjustable supports configured to secure the foot of the user 12 on each platform 32a and 34a. In some embodiments, each foot strap 170 may be formed of a bank of material configured to attach at one or more ends (e.g., hook and loop fastener, button, buckle).

The user support assembly 36a may include a support ring 64a connected to the upright support 48a of the frame 130. In some embodiments, the upright support 48a of the frame 130 may be adjustable to the size of the user 12 (e.g., telescoping portions) such that the support ring 64a may be positioned at a predetermined location of each user 12 (e.g., midsection, waist). Generally, the support ring 64a may be an adjustable support configured to encircle the midsection of the user 12 for stabilization during operation of the system 10a. Adjustments to the size, rigidity and placement of the support ring 64a may aid the user 12 in a ducking or crouching motion. For example, changing from a rigid support to a tethered harness connected to the frame 130 by springs or a bungee cable may aid the user in the ducking or crouching motion as more flexibility may be provided to the body of the user to bend at the knees while still being securely held in position during use of the system 10a.

The support ring 64a may be a flexible band of material configured to encircle a portion of the body of the user 12. The band of material may be continuous or be configured to attach or couple at one or more ends (e.g., hook and loop fastener, button, buckle, hinges). In some embodiments, the support ring 64a may include one or more cushioned portions. For example, the support ring 64a may include one or more portions covered by soft padding providing comfortable support for leaning on by the user. In some embodiments, the one or more cushioned portions may be adjusted and/or tightened to fit the body of the user 12.

Stabilization of the user 12 using the support ring 64a may facilitate a hands-free system (e.g., operation of the virtual reality simulation system 10a or at least the mobility simulation device 16a without using hands). As such, the user 12 may be able to engage in lateral (i.e., side-to-side) movement and simulate walking or running on the first and second reciprocating foot platforms 32a and 34a of the mobility simulation device 16a while the user support assembly 36a provides upright support to the user 12 (e.g., around the user's abdomen) thereby allowing the user 12 to freely use its hands and further enhance the virtual reality experience.

The movement detection mechanism 18 may determine position of each of the first reciprocating foot platform 32a and/or the second reciprocating foot platform 34a. In some embodiments, the movement detection mechanism 18 may provide vector data of the first reciprocating foot platform 32a in at least a first dimension (e.g., x-direction) and a second dimension (e.g., y-direction). Additionally, the movement detection mechanism 18 may provide acceleration data, rotation data, and/or the like. The movement detection mechanism 18 may use the one or more sensors 80 to determine position data and/or movement of the first reciprocating foot platform 32a and/or the second reciprocating foot platform 34a similar to the first reciprocating foot platform 32 and the second reciprocating foot platform 34 in FIGS. 1A and 1B.

The one or more sensors 80 may be attached to the mobility simulation device 16a, embedded within the first reciprocating foot platform 32a and/or the second reciprocating foot platform 34a, attached and/or embedded within legs 132 and/or 134, and/or attached to the user 12 (e.g., strapped to one or more legs of the user 12). For example, the movement detection mechanism 18 may include one or more sensors 80 attached to the first reciprocating foot platform 32a and/or second reciprocating foot platform 34a. Sensors 80 may include, but are not limited to inertial measurement unit sensors (IMU), infrared emitters and infrared sensor systems, natural interaction sensors, and/or the like, as described in detail herein.

For example, in some embodiments, the movement detection mechanism 18 may use one or more infrared emitter(s) 82 and infrared sensor(s) 84 to determine position data and/or movement data of the first reciprocating foot platform 32a and/or the second reciprocating foot platform 34a.

Generally, the infrared emitter 82 may be positioned on the first reciprocating foot platform 32*a* and/or the body of the user 12. The infrared sensor 84 may be positioned on the base support 38*a* and configured to track the infrared emitter 82 to provide position (x, y, z) of the infrared emitter 82 at a first time $T_0$ and a second time $T_1$. The values of position (x, y, z) and the first time $T_0$ and a second time $T_1$. may be used to determine distance and speed traveled by the infrared emitter 82, for example. In another example, one or more external sensors 80 may be attached to the frame 130 and able to telescope or extend away from the platforms 132*a* and 134*a*. The platforms 132*a* and 134*a* may include the infrared emitter 82. As each platforms 132*a* and 134*a* swing forward and backward, infrared light may be emitted and received by the infrared sensor 84 attached to the frame 130. In another example, as shown in FIG. 8, the first reciprocating foot platform 32*a* may move in a pendulum type motion from a fixed axis. The IMU system may measure acceleration (e.g., position and movement data) in one or more dimensions (e.g., x, y and/or z) and provide acceleration and elapse time to the controller CPU 20. The values of acceleration and elapse time may be used to determine change in distance and velocity, for example.

Figure 9:
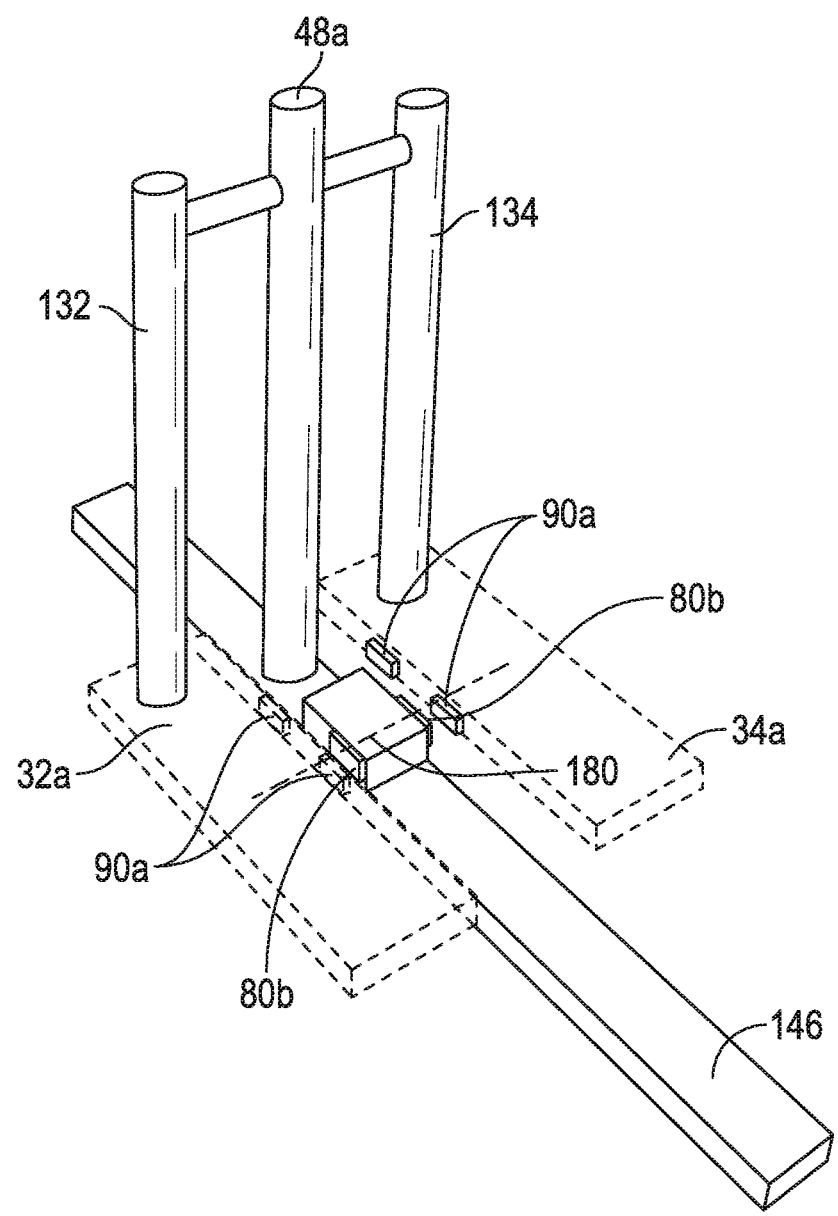
FIG. 9 illustrates another exemplary embodiment of the movement detection mechanism for use in the virtual reality simulation system illustrated in FIG. 6.

FIG. 9 illustrates another exemplary embodiment of the movement detection mechanism 18*b* wherein a plurality of emitters 90*a* (e.g., magnets) may be positioned on the first reciprocating foot platform 32*a* and the second reciprocating foot platform 34*a*. Emitters may include, but are not limited to, magnets, RFID tags, laser light emitters, and/or the like. One or more sensors 80*b* may be positioned on the beam 146. Position of the one or more sensors 80*b* may serve as a boundary for registration of passing of the emitters 90*a*. For example, as illustrated in FIG. 9, position of the sensor 80*b* may serve as a boundary 180 such that if the emitter 90*a* on the first reciprocating foot platform 32*a* is detected prior to the emitter 90*a* on the second reciprocating foot platform 34*a*, then the user is moving in a backward motion, for example. If the emitter 90*a* on the first reciprocating foot platform 32*a* is detected secondary to the emitter 90*a* on the second reciprocating foot platform 34*a*, then the user is moving in a forward motion, for example. Pulses detected by the sensor 80*b* may represent steps, and speed of the pulses may relate to speed of walking, running, and/or the like.

Sensors 80*b* may include, but are not limited to, magnetic sensors, RFID sensors, laser light sensors, and/or the like. In some embodiments, multiple sensors 80*b* may be positioned about the beam 146. In this example, position of each of the first reciprocating foot platform 32*a* and the second reciprocating foot platform 34*a* may registered when passing each sensor 80*b*.

In some embodiments, each emitter 90*a* may have a different strength. By using emitters 90*a* having different strengths, the sensor(s) 80*b* may be configured to determine which emitter 90*a* passes first (e.g., first emitter vs. second emitter.

The movement detection mechanism 18 may provide the signal 70 indicative of position and/or movement data to the controller CPU 20. The controller CPU 20 may receive the signal 70 and process the position data and/or movement data into one or more step metrics as described in detail herein. The one or more step metrics may then be provided to the virtual environment computer processor(s) 22 via the signal 72.

From the above description, the inventive concepts disclosed are well adapted to carry out the objects and to attain the advantages mentioned and those inherent in the inventive concepts disclosed. While exemplary embodiments of the inventive concepts disclosed have been described for this disclosure, it will be understood that numerous changes may be made which will readily suggest themselves to those skilled in the art and which are accomplished within the scope and coverage of the inventive concepts disclosed.

The invention claimed is:

1. A virtual reality simulation system for use with a sensory feedback system, comprising:
  a mobility simulation device comprising:
    a frame having a base support and an upright support extending from the base support;
    a first foot platform movably connected to the upright support;
    a second foot platform movably connected to the upright support; and
    a support ring connected to the frame,
    wherein at least a portion of the frame is movably connected such that the first foot platform, the second foot platform, and the support ring are movable relative to at least a portion of the base support; and
  a movement detection mechanism having at least one sensor attached to the mobility simulation device, the movement detection mechanism configured to:
    collect movement and position data of the first foot platform; and
    generate a first signal indicative of the movement and position data of the first foot platform.

2. The virtual reality simulation system of claim 1, further comprising:
  a controller computer processor unit configured to:
    receive the first signal from the movement detection mechanism;
    translate the first signal into a step metric; and
    generate a second signal indicative of the step metric.

3. The virtual reality simulation system of claim 2, further comprising:
  a virtual environment computer processor unit configured to receive the second signal from the controller computer processor unit and enable the sensory feedback system to display images relative to the step metric.

4. The virtual reality simulation system of claim 1, wherein the first foot platform moves in conjunction with the second foot platform.

5. The virtual reality simulation system of claim 1, further comprising:
  a left crank rotatably mounted on the upright support; and
  a right crank rotatably mounted on the upright support.

6. The virtual reality simulation system of claim 5, further comprising:
  a first leg rotatably connected to the left crank and movably connected to the first foot platform; and
  a second leg rotatably connected to the right crank and movably connected to the second foot platform.

7. The virtual reality simulation system of claim 1, further comprising:
  a first side body support extending from the frame to the support ring; and
  a second side body support extending from the frame to the support ring.

8. The virtual reality simulation system of claim 1, further comprising:
  a swivel joint connected to the upright support such that the first foot platform, the second foot platform, and the support ring are rotatable relative to the base support.

9. The virtual reality simulation system of claim 1, wherein the movement detection mechanism is an inertial measurement unit sensor configured to measure acceleration.

10. The virtual reality simulation system of claim 1, wherein the movement detection mechanism includes an infrared emitter in communication with an infrared sensor.

11. The virtual reality simulation system of claim 1, wherein the first foot platform is configured to move in a first elliptical path, and the second foot platform is configured to move in a second elliptical path.

12. The virtual reality simulation system of claim 1, wherein the mobility simulation device is configured to provide a gliding motion for the first foot platform and the second foot platform.

13. The virtual reality simulation system of claim 1, wherein the mobility simulation device further comprises a first leg and a second leg connected to the upright support via an axle such that the first leg and the second leg move in a pendulum motion about the axle.

14. The virtual reality simulation system of claim 13, wherein the first foot platform is fixedly attached to the first leg and the second foot platform is fixedly attached to the second leg.

15. The virtual reality simulation system of claim 14, further comprising:
a second sensor attached to the second foot platform,
wherein the at least one sensor is a first sensor attached to the first foot platform.

16. A computer system comprising one or more non-transitory computer readable mediums storing computer executable code that when executed by one or more servers of the computer system cause the one or more servers to:
receive a first signal from a movement detection mechanism having at least one sensor attached to a mobility simulation device, the first signal indicative of movement and position data of a first foot platform of the mobility simulation device, the movement detection mechanism configured to collect the movement and position data of the first foot platform and generate the first signal;
translate the first signal into a step metric; and
generate a second signal indicative of the step metric,
wherein the mobility simulation device further comprises:
a frame having a base support and an upright support extending from the base support;
a second foot platform movably connected to the upright support; and
a support ring connected to the frame,
wherein the first foot platform is movably connected to the upright support and at least a portion of the frame is movably connected such that the first foot platform, the second foot platform, and the support ring are movable relative to at least a portion of the base support.

* * * * *